Jan. 21, 1964   R. H. YOST ETAL   3,118,494
COMBINATION PRESSURE REGULATOR AND CONTROL DEVICES
Filed Feb. 2, 1959   2 Sheets-Sheet 1
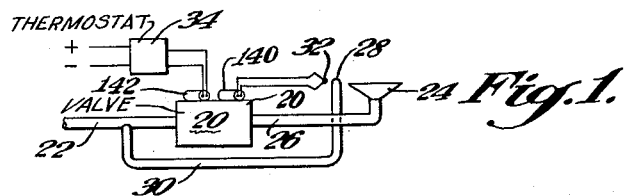
Fig. 1.
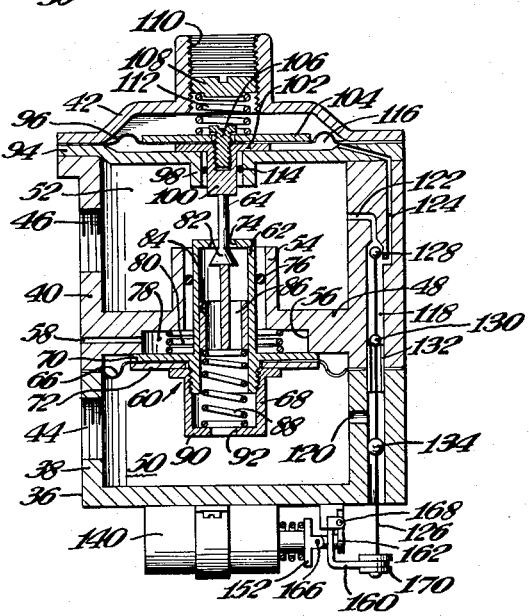
Fig. 2.
Fig. 3.

United States Patent Office 3,118,494
Patented Jan. 21, 1964

3,118,494
COMBINATION PRESSURE REGULATOR AND
CONTROL DEVICES
Richard H. Yost, Compton, and John P. Ward, Anaheim, Calif., assignors to Robertshaw Controls Company, a corporation of Delaware
Filed Feb. 2, 1959, Ser. No. 790,533
8 Claims. (Cl. 158—130)

This invention relates to combination pressure regulator and control devices and, more particularly, to devices of the type adapted primarily for use in fluid fuel burner control systems.

Such systems are customarily provided with a heating burner, a pilot light and a temperature responsive device, such as a thermostat, for controlling the flow of fuel in accordance with the requirements of the substance being heated. In many systems, the thermostat functions to reduce the flow rate as the temperature approaches the desired controlled temperature, and to increase the flow rate as the temperature decreases below the control temperature; however, it is contemplated that this invention be used, in conjunction with a thermostat, to provide full "on-off" (selective shut-off) control of the flow. During "on" periods, it is also desirable to regulate the pressure of the fluid fuel flowing to the burner. Furthermore, it is desirable to provide automatic shut-off in the event that the pilot light should become extinguished, or if the inlet pressure decreases below a safe level.

It is an object of this invention to combine the features of a pressure regulator, automatic shut-off and selective shut-off valve into a single device.

It is a further object of this invention to control operation of the shut-off features by low power sources.

A further object of this invention is to automatically shut off the flow of fluid fuel if the inlet pressure of the fuel decreases below a predetermined level.

movable valve seat and a movable valve cooperate with one another to control the flow of fluid fuel through a valve casing. The valve seat and the valve are actuated by pressure responsive means to effect the desired control.

In accordance with another feature of this invention, the valve seat may be carried by pressure responsive means which, when the inlet pressure decreases below a predetermined level, causes the valve seat to move relative to and into engagement with the valve to shut off the flow of fluid.

In accordance with still another feature of this invention, pilot passage and valve means are connected to the pressure responsive means to control movement between the valve seat and the valve during the selective shut-off and automatic shut-off operations.

In accordance with one feature of this invention, a

A pair of solenoids are adapted to be respectively connected to a thermocouple and a thermostat. The solenoids actuate a pair of armatures which are connected to a mechanical linkage that controls the position of the valve means in the pilot passage means such that when the solenoid connected to the thermocouple is energized, the other solenoid can move between "on" and "off" positions to control the flow of fluid fuel thrugh the casing and, when the solenoid connected to the thermocouple is de-energized, the other solenoid is ineffective to provide on-off control of the flow of fuel.

Other objects and advantages of this invention will be apparent from the following description taken in connection with the accompanying drawings wherein:

FIG. 1 is a diagrammatic view of a system embodying this invention;

FIG. 2 is a partial longitudinal section view through one embodiment of this invention;

FIG. 3 is a bottom view of the device shown in FIG. 2;

Figure 4:
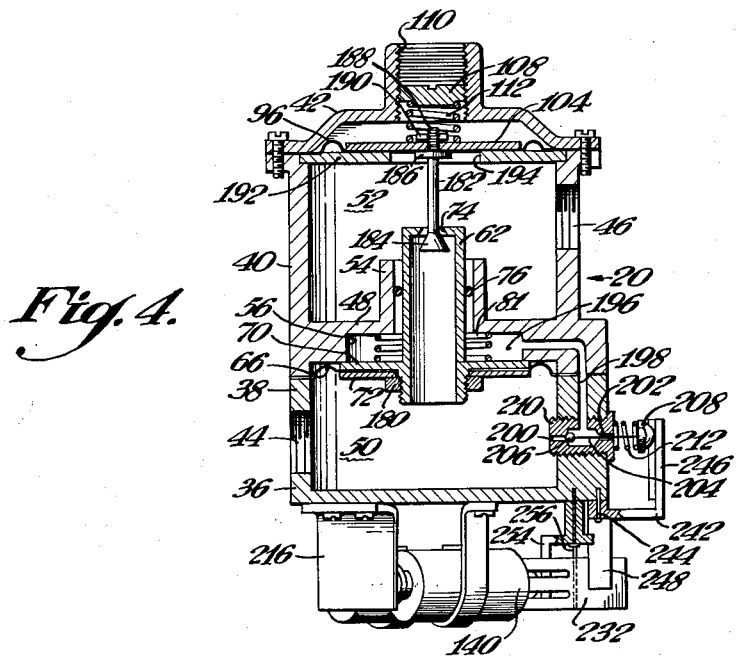
FIG. 4 is a partial longitudinal section view of another embodiment of this invention.

Referring now more particularly to the drawings, one system in which this invention may be used is illustrated in FIG. 1. The control device, indicated generally by reference numeral 20 is connected to a fluid fuel supply line 22 and to a heating burner 24 through a pipe 26. A pilot burner 28 is disposed adjacent to burner 24 and is connected to supply line 22 by a bypass conduit 30 to provide a continuously burning pilot light for igniting heating burner 24. A thermocouple 32 responsive to the temperature of the pilot burner 28 is electrically connected to a safety solenoid 140, which solenoid mechanically actuates the valve of the control device 20 between open and closed positions as described hereinbelow to permit fluid flow. Also, a conventional thermostat 34, positioned within a space being heated by burner 24, is electrically connected intermediate a source of power and a thermostat solenoid 142. Energization of solenoid 142 in response to the requirements of the space being heated mechanically actuates the valve of control device 20 to supply fuel to burner 24. Solenoid 142 can only effectively actuate control device 20 between open and closed positions when solenoid 140 is energized to the open position to allow fuel flow, as is described more particularly hereinbelow.

In operation, thermocouple 32 generates energy in response to the flame of pilot burner 28 which energy retains safety solenoid 140 in the open position. Fluid flow through control device 20 is then exclusively controlled by the actuation of solenoid 142. When thermostat 34 calls for heat, solenoid 142 is energized to actuate control device 20 to the open position to allow fluid flow; and when sufficient heat is present in the space in which thermostat 34 is disposed, solenoid 142 will be deenergized. If at any time the flame at pilot burner 28 is extinguished, safety solenoid 140 will be deenergized to override the action of solenoid 142 and close control device 20.

In the embodiment shown in FIGS. 2 and 3, control device 20 is provided with a casing 36 comprising a pair of cup-shaped casing members 38 and 40, and an end closure plate 42. Casing member 38 is formed with an inlet 44, adapted to be connected to supply line 22, whereas, casing member 40 is formed with an outle 46, adapted to be connected to pipe 26.

Bottom wall 48 of casing member 40 generally forms partition means for dividing the interior into an inlet chamber 50 and an outlet chamber 52. Wall 48 is formed with an axial collar 54, a counterbore 56 and a bleed or vent port 58.

Valve means are provided for controlling the flow of fluid through casing 36 and generally comprise a caged valve assembly 60, including a valve seat member 62 and a valve member 64, carried by a flexible diaphragm 66 which is marginally secured between casing members 38 and 40. Valve seat member 62 is provided with a generally tubular body, one end of which is threaded to receive a cup-shaped cap 68. An annular flange 70 extends radially outwardly from the body portion and overlies a portion of diaphragm 66. An annular back-up disc 72 underlies diaphragm 66 so that cap 68 connects disc 72, diaphragm 66 and valve seat member 62. The other end of valve seat member 62 is formed with an end wall having an aperture therethrough, the walls of which are tapered and form a valve seat 74. An annular sliding seal 76 is disposed between collar 54 and valve seat member 62 to form a pressure chamber 78 between wall 48 and diaphragm 66. A helical spring 80 extends between flange 70 and wall 48 and tends to bias valve assembly 60 away from wall 48 into inlet chamber 50.

Valve member 64 is formed with a tapered valve 82 which cooperates with valve seat 74 for controlling the fluid flow. One end of valve member 64 is formed with a cylindrical guide member 84 which is slidably disposed on the interior of valve seat member 62 and is formed with a plurality of flow passages 86 extending therethrough. A helical compression spring 88 extends between the bottom of member 84 and end wall 90 of cap 68 and biases valve 82 towards engagement with valve seat 74. End wall 90 is formed with a flow aperture 92 whereby inlet chamber 50 may communicate with outlet chamber 52.

A stop plate 94 and a flexible diaphragm 96 are marginally secured between casing member 40 and plate 42. Stop plate 94 has an axial hub 98 formed with a central bore in which a valve actuator 100 is slidably disposed. One end of valve actuator 100 may engage valve member 64 and cause the same to move relative to valve seat member 62. The other end of actuator 100 is formed with an annular flange 102 which underlies a portion of diaphragm 96. An annular back-up plate 104 overlies a portion of diaphragm 96 and is secured to actuator 100 by a screw 106 so that actuator 100 moves with diaphragm 96.

An adjusting screw 108 is rotatably received by a threaded portion 110 of plate 42. A helical compression spring 112 extends between adjusting screw 108 and back-up plate 104 and biases valve actuator 100 towards engagement, in a limiting position, with stop plate 94, as shown in FIG. 2. A sliding annular seal 114 is disposed between actuator 100 and hub 98 to form a control chamber 116 on the underside of diaphragm 96.

Pilot passage and valve means are provided for selectively transmitting pressure from inlet chamber 50 and outlet chamber 52 to control chamber 116, and comprise a main pilot passage 118 which communicates with inlet chamber 50 through a port 120. Similarly, a port 122 affords communication between outlet chamber 52 and pilot passage 118. Likewise, a port 124 extends between chamber 116 and flow passage 118. A movable, elongated, thin rod 126 has a resilient ball valve 128 connected to one end thereof which closes port 122 when rod 126 is in one position. Another resilient ball valve 130 is connected to rod 126 intermediate to the ends thereof and cooperates with a sleeve valve seat member 132, disposed within pilot passage 118, and is effective to close pilot passage 118 and port 120 when rod 126 is in another position.

A resilient sealing ball 134 is connected to rod 126 at a point in pilot passage 118 between port 120 and the atmosphere to prevent gas from leaking from casing 36. When in the position shown in FIG. 2, valve 130 engages valve seat member 132 so that pressure in outlet chamber 52 is transmitted through port 122, pilot passage 118 and port 124, to control chamber 116. When valve 128 closes port 122, pressure is transmitted from inlet chamber 50 through port 120, pilot passage 118 and port 124 to control chamber 116.

Actuating and control means are provided for moving rod 126 between positions and generally comprises a pair of solenoids 140 and 142 and lever means 144. Solenoids 140 and 142 are connected to casing 36 by a pair of mounting brackets 146 and 148 and a plurality of screws 150. Solenoid 140 has a movable armature 152 associated therewith which is biased away from an attracted position with solenoid 140 by a helical spring 154. Similarly, an armature 156 is biased by a helical spring 158 away from an attracted position with solenoid 142. In FIG. 3, both armatures are attracted.

Lever means 144 comprises a pair of levers 160 and 162. Lever 162 is connected to a stationary pivot pin 164 and pivots in a plane parallel to the bottom of casing 36. Lever 160 is connected to armature 152 by a movable pivot pin 166 and is further connected to lever 162 by another movable pivot pin 168. A groove 172 is formed in one end of lever 160 and carries a connector 170 which in turn is connected to actuate rod 126 in response to movement of lever 160.

The actuating means is so arranged that when armature 152 is attracted, movement of armature 156 between attracted and unattracted positions causes rod 126 to move between positions. However, if armature 152 is not attracted, movement of armature 156 between positions is ineffective to move rod 126. If armature 156 is released from the position shown in FIG. 3, lever 162 pivots counterclockwise about pivot 164 causing lever 160 to pivot counterclockwise, as viewed in FIG. 2, about pivot 166 causing rod 126 to move upwardly so that valve 128 closes port 122 thereby transmitting inlet pressure to the control chamber 116. This movement is reversed when armature 156 subsequently moves to an attracted position.

Should armature 152 be released from the position shown in FIG. 3, the bias of spring 154 causes lever 160 to pivot counterclockwise about pivot pin 168, as viewed in FIG. 2, causing rod 126 to move between positions so that the inlet chamber 50 communicates with control chamber 116.

In operation, normal inlet pressures acting against diaphragm 66, cause valve assembly 60 to move upwardly to a limiting position wherein flange 70 contacts wall 48, as shown in FIG. 2. With both solenoids 140 and 142 energized, pressure in outlet chamber 52 is transmitted to control chamber 116 and acts on the underside of diaphragm 96 in opposition to the force of spring 112. If the outlet pressure is below a predetermined value, spring 112 causes valve actuator 100 to move to a limiting position in contact with stop plate 94 so that valve 82 and valve seat 74 assume a maximum open position. This predetermined pressure may be varied by rotation of adjusting screw 108, which changes the force of spring 112 acting against plate 104. Movement of valve actuator 100 from an "off" to a limiting position causes valve member 64 to move downwardly against the bias of the spring 88. If the outlet pressure increases above this value, the valve actuator 100 moves upwardly against the bias of spring 112 until a balanced condition is reached. Upward movement of actuator 100 allows spring 88 to move valve member 64 upwardly to maintain contact with valve actuator 100, with the resultant decrease in separation between valve 82 and valve seat 74 and hence a decrease in the flow rate. Subsequent decreases in outlet pressure, reverse the above action to effect the desired pressure regulation. It should be noted that port 124 acts as a bleed passage to allow valve 82 to move slowly, without surge.

De-energization of either or both solenoids 140 and 142 causes valve 128 to block port 122 and valve 130 to disengage from valve seat member 132 so that the inlet pressure is transmitted to control chamber 116. The inlet pressure is normally higher than the outlet pressure and the force created thereby, acting against the underside of diaphragm 96, is sufficient to move valve actuator 100 upwardly. Valve member 64 moves upwardly at the same rate until valve 82 engages valve seat 74 to shut off the flow of fluid through casing 36. When the fluid flow is shut off, further upward movement causes valve actuator 100 to disengage from valve member 64.

If the inlet pressure decreases below a certain value, the force of spring 80 is sufficient to move valve assembly 60 downwardly from engagement with wall 48. If the valve means is closed when the inlet pressure decreases, the pressure at which valve assembly 60 moves is determined solely by the force of spring 80 and the unbalanced area of valve seat member 62 being acted upon by the difference in pressures between the inlet chamber 50 and the outlet chamber 52. But, if the valve means is open, the additional force of spring 88, being slightly compressed, is added which increases the pressure at which the valve assembly 60 begins downward movement. When valve assembly 60 is sufficiently out of contact with wall 48, movement of valve actuator 100 cannot open the valve means.

If solenoid 140 becomes de-energized in response to failure of the pilot light, it is necessary to reset control device 20, since subsequent energization of solenoid 140 is insufficient to move armature 152 to an attracted position. To reset, it is necessary to pull lever 160 upwardly causing rotation thereof about pivot 168 until armature 152 is attracted to solenoid 140.

Figure 5:
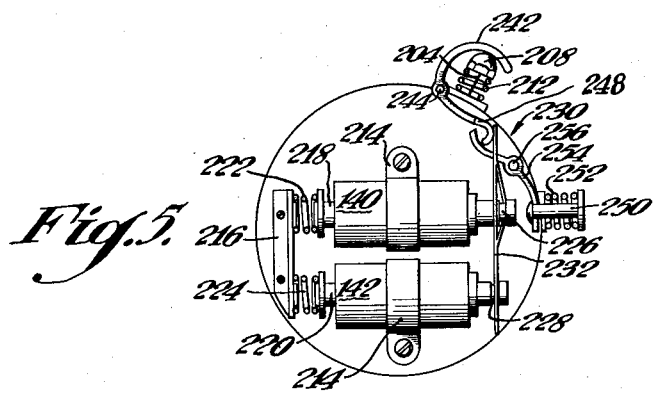
FIG. 5 is a bottom view of the device shown in FIG. 4.
Figure 6:
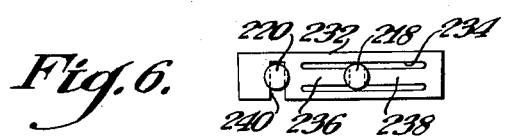
FIG. 6 is a plan view of a detail shown in FIGS. 4 and 5.

In the embodiment shown in FIGS. 4, 5, and 6, many parts remain the same and are indicated by identical reference numerals. In this embodiment, the valve seat member 62 is connected to diaphragm 66 by a nut 180 which secures diaphragm 66 between flange 70 and disc 72.

Valve member 182 is formed with a tapered valve 184 which is movable relative to valve seat 74 for controlling the flow of fluid through casing 36. The other end of valve member 182 is formed with an annular radially extending flange 186 and a threaded portion 188 which is attached to diaphragm 96 and plate 104 by a nut 190 so that valve member 182 is carried by diaphragm 96 for movement therewith.

A stop ring 192 is marginally secured between casing member 40, plate 42 and diaphragm 96, and is formed with a central opening 194 through which pressure in outlet chamber 52 is transmitted to the underside of diaphragm 96.

A control chamber 196 is formed between diaphragm 66 and wall 48 and is selectively communicable with inlet chamber 50 through a pilot passage 198 and port 200, and with the atmosphere through pilot passage 198 and port 202. Valve means are provided for controlling this communication and generally comprises a thin rod 204 which passes through port 202 and is formed with a ball valve 206 on the inner end thereof which is adapted to engage and close port 200 or port 202. The other end of rod 204 is connected to a nut 208. Ports 200 and 202 are formed in a plug 210 which is screwed into casing 36. A helical spring 212 extends between plug 210 and nut 208 to bias rod 204 outwardly to close port 202. It should be noted that in both embodiments the pressure differentials across valve 206 and sealing ball 134 are small so that relatively little force is necessary to cause movement thereof.

Solenoids 140 and 142 are mounted on casing 36 by a plurality of brackets 214. A bearing plate 216 is mounted on the bottom of casing 36 and extends upwardly. Solenoids 140 and 142 have a pair of armatures 218 and 220 associated therewith respectively and a pair of helical compression springs 222 and 224 which extend between bearing plate 216 and armatures 218 and 220 respectively to bias the same to the right, as viewed in FIG. 5. At the other ends, armatures 218 and 220 are formed with a pair of grooves 226 and 228 respectively.

To actuate valve 206, linkage means, indicated generally by reference numeral 230, extend between nut 208 and solenoids 140 and 142 and includes a snap blade 232. An H-shaped slot 234 is formed in blade 232 to provide tabs 236 and 238 which have the free ends thereof disposed in groove 226 of armature 218. Blade 232 is also formed with a slot 240 which fits into groove 228 of armature 220 so that blade 232 is carried by both armatures 218 and 220. A lever 242 is pivotally mounted on casing 36 by a pivot 244 and is formed with a curved portion 246, adapted to engage nut 208, and a projecting portion 248, adapted to engage blade 232.

As shown in FIGS. 4 and 5, solenoids 140 and 142 are both energized and armatures 218 and 220 are attracted so that valve 206 closes port 200. The bias of spring 212, acting through nut 208, tends to rotate lever 242 to maintain member 248 in engagement with blade 232. As best seen in FIG. 5, if solenoid 142 becomes de-energized, armature 220 moves to the right under the bias of spring 224 causing the end of snap blade 232 connected thereto to move to the right until the lines of force created by the tabs 236 and 238 cross whereupon blade 232 snaps so that the other end thereof moves to the right and allows lever 242 to pivot counterclockwise to move valve 206 from engagement with port 200 and close port 202. Subsequent energization of solenoid 142 reverses the above movement and causes valve 206 to move between positions to close port 200.

If solenoid 140 becomes de-energized, armature 218 moves outwardly carrying blade 232 therewith and lever 242 pivots counterclockwise, as viewed in FIG. 5, to allow valve 206 to close port 202. In this position, movement of armature 220 is ineffective to cause valve 206 to open port 202.

Reset means are provided to move armature 218 into an attracted position when solenoid 140 is subsequently energized and generally comprises a push button 250, biased outwardly by a helical spring 252, connected to a lever 254 which is pivoted about a pivot 256 which, in turn, is connected to the bottom of casing 36. Upon manual actuation, push button 250 contacts armature 218 causing movement thereof to the attracted position. Subsequent release of push button 250 leaves armature 218 attracted. It should be noted that throughout the resetting operation, valve 206 closes port 202.

In operation, when port 200 is closed by valve 206, control chamber 196 is at atmospheric pressure. Consequently, the normal inlet pressure in inlet chamber 50, being higher than atmospheric pressure, causes diaphragm 66 and valve seat member 62 to move upwardly to a limiting position wherein flange 70 engages wall 48. If the inlet pressure decreases, the pressure differential across diaphragm 66 decreases and upon reaching a predetermined value, diaphragm 66 moves downwardly in response to the bias of spring 81 to a lower limiting position wherein valve 184 engages valve seat 74 and diaphragm 96 engages stop ring 192. However, such movement does not occur under normal inlet pressures. It should be noted that spring 81 is weak enough to permit the normal inlet pressure to move valve seat member 62 upwardly and strong enough to overcome the force on the unbalanced area to move valve seat member 62 downwardly when the pressures across diaphragm 66 are balanced.

As valve seat member 62 moves upwardly, gas flows through valve 184 and valve seat 74. The outlet pressure acts against diaphragm 96 to cause valve member 184 to move against the bias of spring 112. The valve member 182 assumes a position dependent upon the balance in forces between spring 112 and outlet pressure.

If the pressure increases, valve member 182 moves upwardly causing valve 184 to approach valve seat 74 and decrease the flow with resulting decrease in outlet pressure until a balanced condition is reached. Likewise, a decrease in the pressure causes the flow rate to increase and valve member 182 moves to its lower limiting position. When this device is connected to a system such as that illustrated in FIG. 1, the operation provides pressure regulation of gas flowing through casing 36, selective shut-off in response to energization and deenergization of solenoid 142, as controlled by thermostat 34, and automatically shut-off in the even of pilot light outage, or if the inlet pressure decreases sufficiently.

Although the pilot passage and valve means disclosed utilize the fluid fuel for controlling the shut-off, it may be desirable to use control media other than the fuel flowing through casing 36. For this, the pilot passage and valve means may be separate from the main unit. Also, it may be completely eliminated, as for example, by connecting a temperature responsive device directly to control device 20 such that expansion of a temperature sensitive medium is introduced into the control chamber. When using the fluid fuel itself, it may be also desirable to insert a filter into the ports communicating directly with inlet chamber 50 and outlet chamber 52 to prevent clogging thereof.

By obvious expediencies, it will be apparent that the valve seat member and the valve member can be interchanged. Furthermore, although the invention has been described with reference to fluid fuel burning systems, the use thereof is not so limited. It can obviously be adapted to any system having similar fluid flow requirements.

In some applications involving pressures great enough to overcome the static friction involved, diaphragms 66 and 96 may be eliminated by providing piston means having sliding seal means disposed against suitably formed casing walls. It will be understood that many changes and modifications may be made without departing from the scope of the invention as defined in the appended claims.

We claim:

1. A fluid flow control device comprising: a casing formed with an inlet, an outlet, and a flow passage extending between said inlet and said outlet; valve means disposed in said flow passage for controlling a flow of fluid through said casing, said valve means comprising a pair of valve elements movable relative to one another; first pressure operated means disposed within said casing and being operably connected to move one of said valve elements in response to changes in pressure at said inlet; second pressure operated means disposed in said casing and being operably connected to move the other of said valve elements in response to changes in pressure at said outlet; control chamber means positioned adjacent one of said pressure operated means; and means operably connected to said control chamber means for selectively admitting a fluid thereto to cause said valve elements to move relative to one another to provide control shut-off of fluid flowing through said casing.

2. A fluid flow control device for fluid fuel burning systems having a heating burner, a pilot burner, a thermocouple responsive to a flame at the pilot burner, and a thermostat for controlling flow of fuel to the heating burner, comprising: a valve casing formed with an inlet adapted to be connected to a source of fuel, an outlet adapted to be connected to the heating burner, and a flow passage extending between said inlet and said outlet; valve means disposed within said flow passage and being movable between positions for controlling a flow of fuel through said casing, said valve means comprising a pair of valve elements movable in opposite directions relative to one another between open and closed positions; first pressure operated means disposed within said casing and being connected to one of said valve elements, said first pressure operated means being responsive to an increase in pressure above a predetermined level at said inlet to move said one valve element from a closed to an open limiting position; and second pressure operated means disposed within said casing and being operably connected to move the other of said valve elements between controlling open positions in response to change in pressure at said outlet to regulate fuel flowing to said burner when said one valve element is in said limiting position, a control chamber provided adjacent to said first pressure operated means to control movement one of said valve elements, and means operatively connected to said control chamber for selectively transmitting fluid at said inlet and atmospheric pressure to said control chamber to move one of said valve elements between said closed and limiting positions.

3. The device of claim 2 in which said first pressure operated means is further movable from said limiting position to said closed position in response to decreases in pressure at said inlet below a predetermined value to prevent fuel from flowing to the heating burner.

4. A fluid flow control device comprising: a casing formed with a hollow interior and partition means dividing said interior into an inlet chamber and an outlet chamber, said partition means being formed with an aperture therethrough; a flexible diaphragm disposed in said inlet chamber and being marginally secured to said casing to form a pressure chamber between said diaphragm and said partition means, said diaphragm being formed with an aperture therethrough in substantial alignment with said aperture through said partition means; a tubular valve seat member connected at one end to said aperture in said diaphragm for movement therewith and having the other end slidably disposed within said aperture of said partition means, said other end being formed with a valve seat; sealing means disposed between said partition means and said valve seat member to seal said pressure chamber; and a valve movable relative to said valve seat for controlling a flow of fluid through said tubular valve seat member from said inlet chamber to said outlet chamber, said valve seat being movable relative to said valve in response to a predetermined pressure differential across said diaphragm for preventing a flow of fluid between said inlet and said outlet chamber.

5. The device of claim 4 in which pressure responsive means are disposed within said casing and are operably connected to move said valve relative to said valve seat in response to changes in pressure in said outlet chamber.

6. The device of claim 5 in which said valve is formed on a valve member which is carried by said diaphragm responsive to the outlet pressure for movement therewith.

7. The device of claim 4 wherein said valve is formed on a valve member movably carried by said tubular valve seat member, and said diaphragm responsive to outlet pressure carries an actuating member which is engageable with said valve member to move said valve relative to said valve seat in response to changes in outlet pressure.

8. A fluid flow control device comprising a casing formed with an inlet, an outlet, and a flow passage between said inlet and outlet, valve means disposed in said flow passage and being moveable between open and closed positions for controlling a flow of fluid through said casing, said valve means being a pair of valve elements comprising a movable valve and a cooperating movable valve seat, one of the said valve elements mounted to said casing by a first diaphragm and adapted to be movable relative to the other in response to changes in fluid pressure at said outlet to regulate the pressure of fluid flowing through said casing, and the other of said valve elements being mounted to said casing by a second diaphragm and adapted to be movable into engagement with said first valve element in response to decreases in pressure of fluid at said inlet to prevent fluid flow through said casing, a closed expansion chamber formed contiguous with one of said diaphragms; a pilot conduit operatively connected to said expansion chamber, and said casing inlet and outlet chamber; a valve movably mounted in said pilot conduit for selectively permitting fluid from said casing inlet and outlet chambers to enter said expansion chamber, and a means for moving said valve being operatively attached thereto, thereby allowing the valve elements to close irrespective of the pressures at said casing inlet and outlet when said valve moving means are operated.

References Cited in the file of this patent

UNITED STATES PATENTS

| | | |
|---|---|---|
| 2,295,427 | Puster | Sept. 8, 1942 |
| 2,318,767 | Engholdt | May 11, 1943 |
| 2,517,363 | Thornbery | Aug. 1, 1950 |
| 2,676,757 | Thornbery | Apr. 27, 1954 |
| 2,685,412 | Schell | Aug. 3, 1954 |
| 2,940,462 | Johanson | June 14, 1960 |

FOREIGN PATENTS

| | | |
|---|---|---|
| 99,191 | Sweden | June 25, 1940 |
| 537,834 | Germany | Nov. 7, 1931 |
| 876,587 | France | Aug. 10, 1942 |